(12) United States Patent
Mohammed et al.

(10) Patent No.: US 12,379,878 B1
(45) Date of Patent: Aug. 5, 2025

(54) DATA STORAGE DEVICE AND METHOD FOR STORING SELECTED DATA IN RELATIVELY-LOWER DATA RETENTION PAGES OF A QUAD-LEVEL CELL MEMORY

(71) Applicant: Sandisk Technologies, Inc., Milpitas, CA (US)

(72) Inventors: Meer Afroz Mohammed, Bengaluru (IN); Pawan Negi, Bengaluru (IN); Bhavadip Solanki, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/733,238

(22) Filed: Jun. 4, 2024

(51) Int. Cl.
*G06F 3/06* (2006.01)

(52) U.S. Cl.
CPC .......... *G06F 3/0659* (2013.01); *G06F 3/0614* (2013.01); *G06F 3/0631* (2013.01); *G06F 3/065* (2013.01); *G06F 3/0679* (2013.01)

(58) Field of Classification Search
CPC ...... G06F 3/0622; G06F 3/0637; G06F 3/065; G06F 3/0659; G06F 3/067; G06F 3/0673
See application file for complete search history.

(56) References Cited

U.S. PATENT DOCUMENTS

2024/0130130 A1 * 4/2024 Liu .................. H10B 41/27
2024/0377961 A1 * 11/2024 Jain .................. G11C 11/5628

* cited by examiner

*Primary Examiner* — Yong J Choe
(74) *Attorney, Agent, or Firm* — Crowell & Moring LLP

(57) ABSTRACT

Different pages of a quad-level cell (QLC) memory can have different data retention characteristics. A controller of a data storage device can store selected data in relatively-lower data retention pages of the QLC block. For example, data for an internal data storage device operation can be stored in the relatively-lower data retention pages of QLC memory, and host data can be stored in the relatively-higher data retention pages of QLC memory. Other examples are provided.

20 Claims, 9 Drawing Sheets

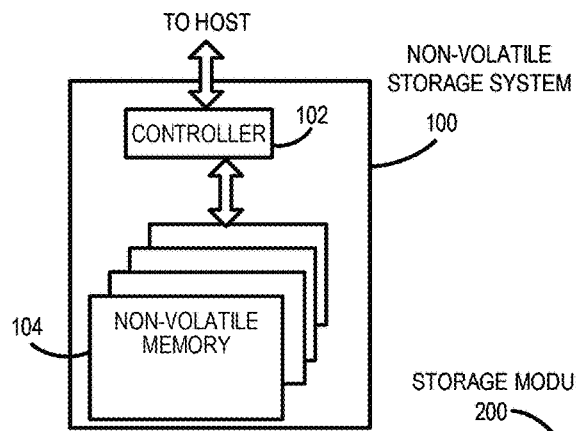
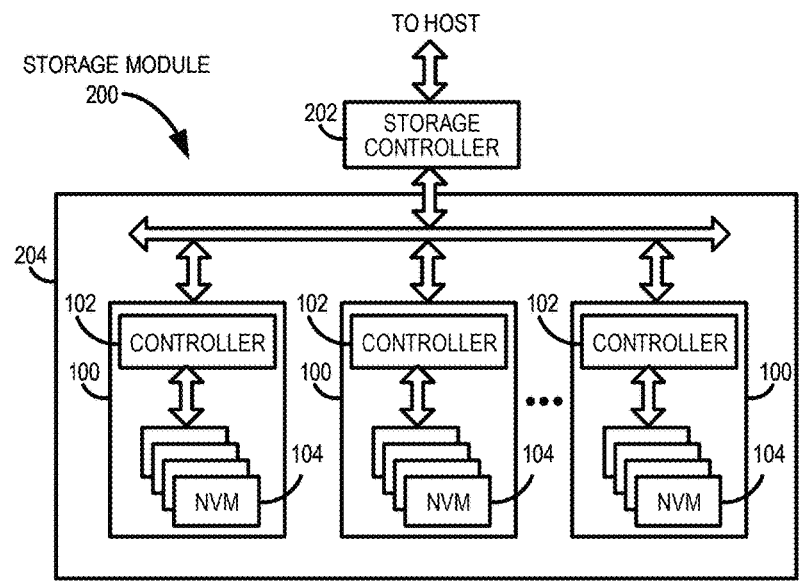
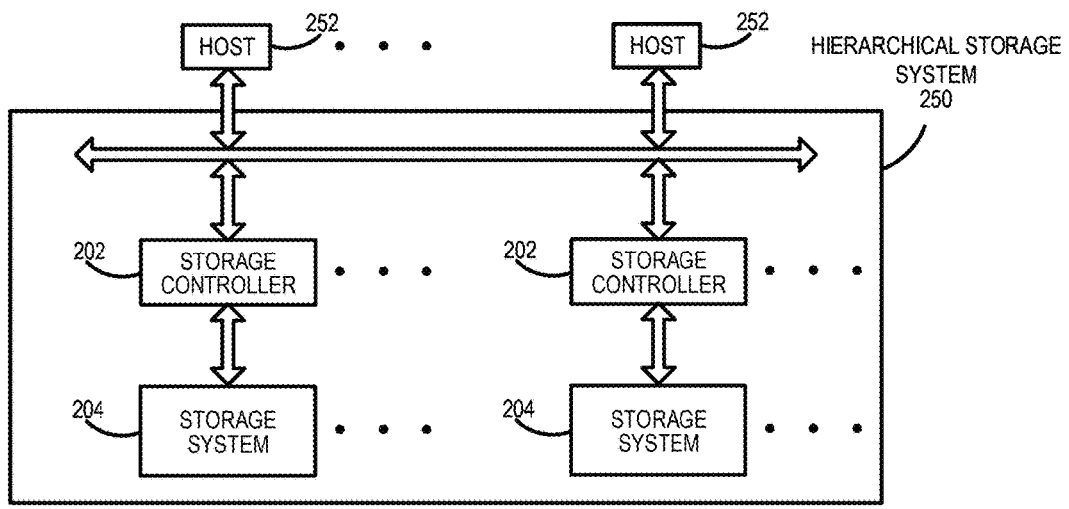
FIG. 1A
FIG. 1B
FIG. 1C

| B6X4 (New) | B6X4 (3444) | S0 | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|---|---|
| T | ('S1', 'S3', 'S7', 'S13') | 1 | 0 | 0 | 1 | 1 | 1 | 1 | 0 | 0 | 0 | 0 | 0 | 0 | 1 | 1 | 1 |
| U | ('S2', 'S8', 'S10', 'S12') | 1 | 1 | 0 | 0 | 0 | 0 | 0 | 0 | 1 | 1 | 0 | 0 | 1 | 1 | 1 | 1 |
| M | ('S4', 'S6', 'S9', 'S15') | 1 | 1 | 1 | 1 | 0 | 0 | 1 | 1 | 1 | 0 | 0 | 0 | 0 | 0 | 0 | 1 |
| L | ('S5', 'S11', 'S14') | 1 | 1 | 1 | 1 | 1 | 0 | 0 | 0 | 0 | 0 | 0 | 1 | 1 | 1 | 0 | 0 |

FIG. 4

| Type of Block | Block Usage Type | Current Block | New Block Count | Block Savings |
|---|---|---|---|---|
| SLC MB/JB | SLC Folding Blocks | 15 | 10 | 5 |
| SLC MB/JB | MTM | 4 | 2 | 2 |
| SLC MB/JB | XOR | 2 | 1 | 1 |
| SLC MB/JB | LOG | 3 | 2 | 1 |
| TLC or SLC MB/JB | BRLC Block (Transit) | 5 | 2 | 3 |
| SLC MB/JB | XOR SS Blocks - 3 | 3 | 2 | 1 |
| | | | Total Block Saving : 13 | |

FIG. 7

DATA STORAGE DEVICE AND METHOD FOR STORING SELECTED DATA IN RELATIVELY-LOWER DATA RETENTION PAGES OF A QUAD-LEVEL CELL MEMORY

BACKGROUND

A memory of a data storage device can be configured as quad-level cell (QLC) pages, where each QLC page is a group of four pages: a lower page (LP), a middle page (MP), an upper page (UP), and a top page (TP). With ever-increasing demand for more capacity in shorter form factors, the use of QLC is likely to increase over time, eventually becoming mainstream for the memory industry.

BRIEF DESCRIPTION OF THE DRAWINGS

FIG. 1A is a block diagram of a data storage device of an embodiment.

FIG. 1B is a block diagram illustrating a storage module of an embodiment.

FIG. 1C is a block diagram illustrating a hierarchical storage system of an embodiment.

FIG. 4 is an illustration of an encoding scheme of an embodiment.

FIG. 7 is a table illustrating a block savings of an embodiment.

DETAILED DESCRIPTION

Figure 2A:
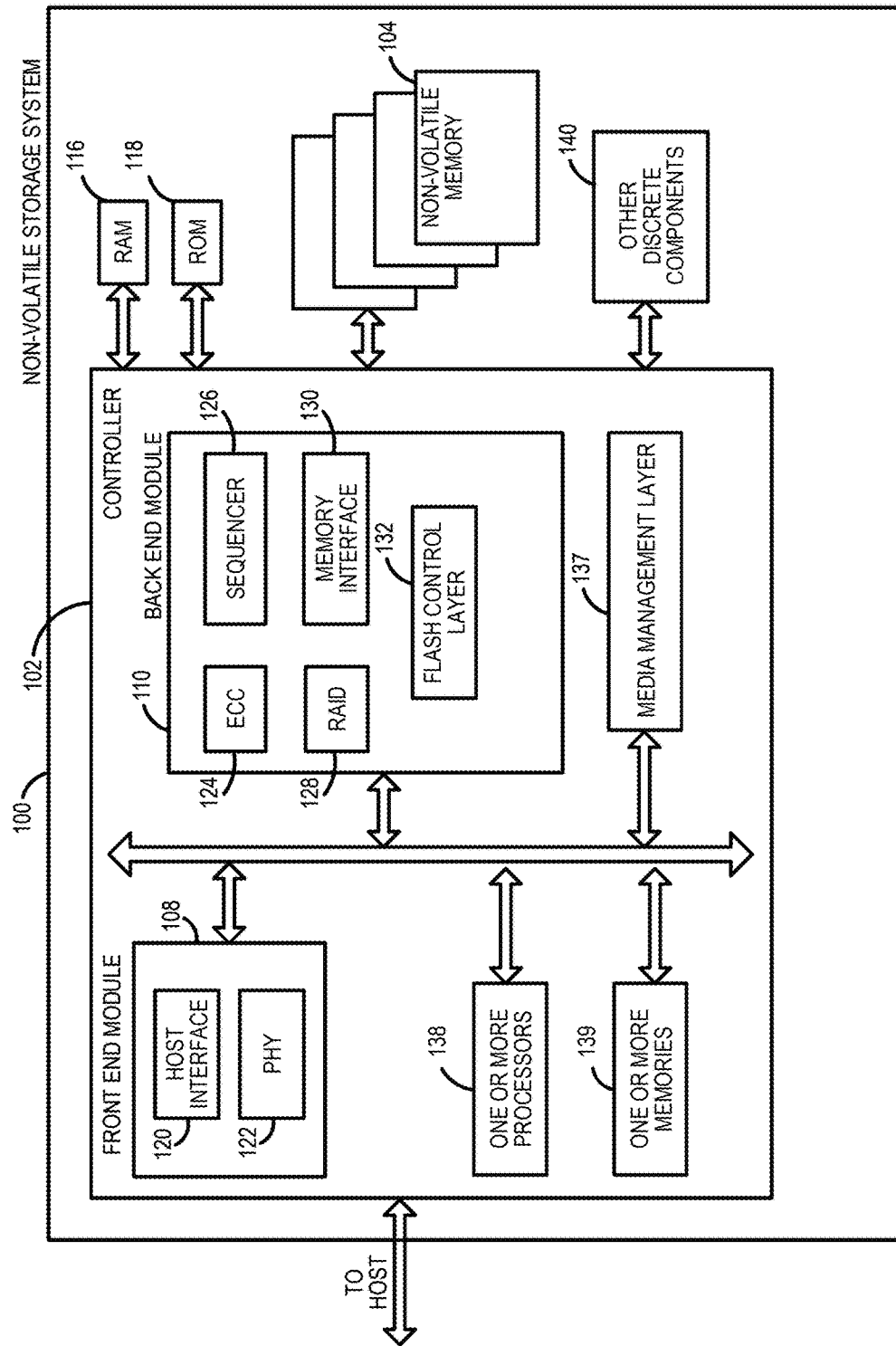
FIG. 2A is a block diagram illustrating components of the controller of the data storage device illustrated in FIG. 1A according to an embodiment.

The following embodiments generally relate to a data storage device and method for storing selected data in relatively-lower data retention pages of a quad-level cell memory. In one embodiment, a data storage device is provided comprising a quad level cell (QLC) memory comprising a lower page (LP), a middle page (MP), an upper page (UP), and a top page (TP), and one or more processors. The one or more processors, individually or in combination, are configured to: determine data reliability of each of the pages; write data for an internal data storage device operation in a first set of pages whose data retention is below a threshold; and write host data in a second set of pages whose data retention is above the threshold.

In another embodiment, a method is provided that is performed in a data storage device. The method comprises: determining if an entry in a priority queue has been halted due to ongoing data operations, wherein the entry is for a priority internal data storage device operation; and in response to determining that the entry has been halted: writing data for the priority internal data storage device operation in page(s) of a quad level cell (QLC) memory whose data retention is above a threshold; and writing host data in other page(s) of the QLC.

In yet another embodiment, a data storage device is provided comprising: a memory comprising a multi-level memory comprising a plurality of pages; and means for: determining data reliability of each of the pages; writing data for an internal data storage device operation in pages whose data retention is below a threshold; and writing host data in pages whose data retention is above the threshold.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
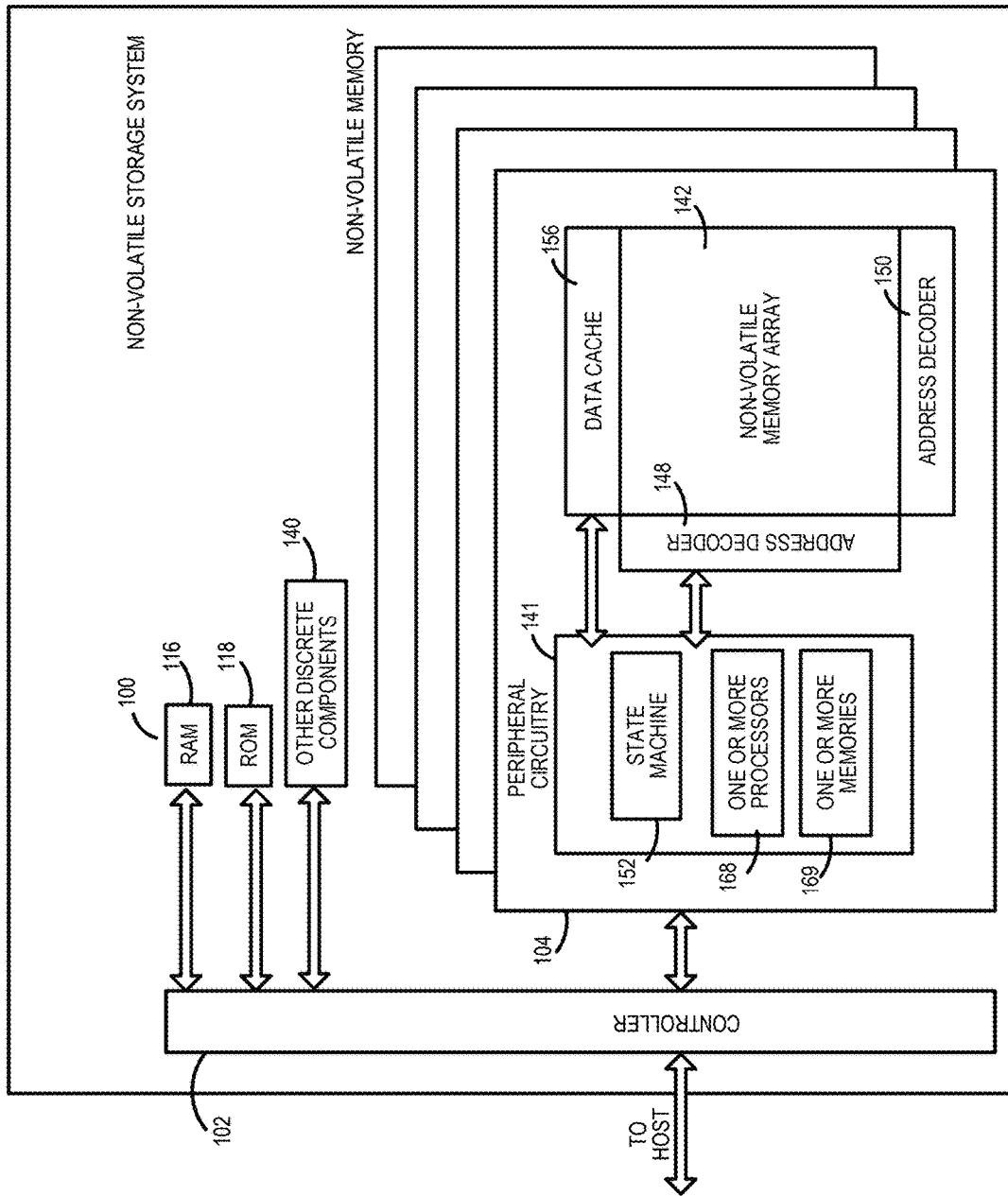
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
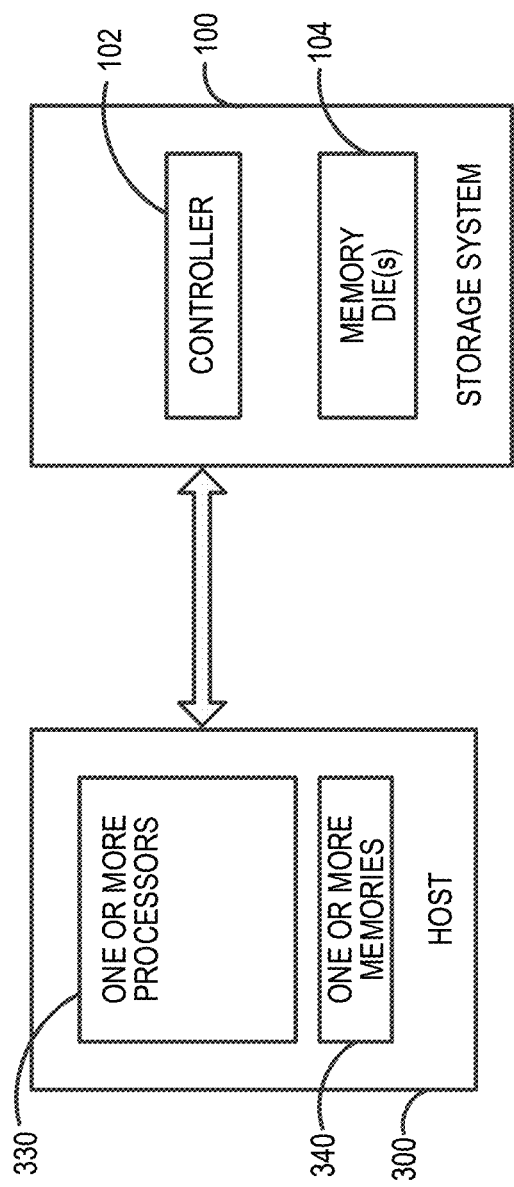
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, the memory 104 of the data storage device 100 can be configured as quad-level cell (QLC) pages, where each QLC page is a group of four pages: a lower page (LP), a middle page (MP), an upper page (UP), and a top page (TP). With ever-increasing demand for more capacity in shorter form factors, the use of QLC is likely to increase over time, eventually becoming mainstream for the memory industry. However, the reliability of QLC is generally comparatively low when compared to triple-level cell (TLC) memory due to more-tightly-packed, narrower voltage thresholds between states being more susceptible to data errors. Also, increasing the number of wordline layers from TLC to QLC increases the block size, which can result in more errors. As such, it can be important to protect QLC blocks with better system handling techniques.

QLC also tends to have shorter data retention compared to TLC or single-level cell (SLC) memory, especially in lower-quality memory devices where there is a relatively-greater risk of lower reliability and shorter data retention. The following embodiments utilize the shorter data retention behavior in certain pages of QLC memory to provide improved system handling techniques. More specifically, in these embodiments, the controller 102 of the data storage device 100 stores selected data in relatively-lower data retention pages of a quad-level cell memory. Any suitable metric can be used as a threshold for what constitutes relatively-lower data retention, some examples of which are provided below. Also, the selected data can take any suitable form. In some of the examples provided below, the selected data is data for an internal data storage device operation, whose lifetime is likely much less than host data. In another example, the selected data is host data, where relatively-higher data retention pages are used for priority internal data storage device operations. Other implementations can be used. Also, while these examples are set forth in terms of QLC memory, it should be understood that other forms of MLC memory (e.g., TLC memory) can be used.

The following example will be used to illustrate one embodiment. It should be understood that this is merely an example and that the details presented herein should not be read into the claims unless expressly recited therein. In this example (see FIG. 4), B6 X4 encoding is used across the four pages of a QLC page: TP (S1, S3, S7, S13), UP (S2, S8, S10, S12), MP (S4, S6, S9, S15), and LP (S3, S11, and S14).

At least one or two of the pages have lower reliability as compared to the other pages. In this example:

TP-3 years at a temperature of 30 C→Good page, so data can be held here relatively long UP-2 years at a temperature of 30 C→Good page, so data can be held here relatively long MP-1 year at a temperature of 30 C→Comparatively-bad page, so data can be held only for 1 year at a temperature of 30 C LP-1.5 years at a temperature of 30 C→Comparatively-bad page, so data can be held only for 1.5 years at a temperature of 30 C In this example, the MP has the lowest data retention followed by the LP. (Any appropriate time or data retention metric threshold can be used.) With this information available across various endurance regions/temperature regions of the memory 104, the controller 102 can utilize short-term data retention pages for internal firmware operations, such as static relocations, folding source data, secondary data copy, hSLC utilization, etc. Also, instead of discarding the QLC block after a short time due to worsening reliability effects, the controller 102 can remember the life of the block and utilize those data retention pages for internal operations (e.g., other than host data programming). These internal operations can last only until the relative-short time of data retention for the pages.

Figure 5:
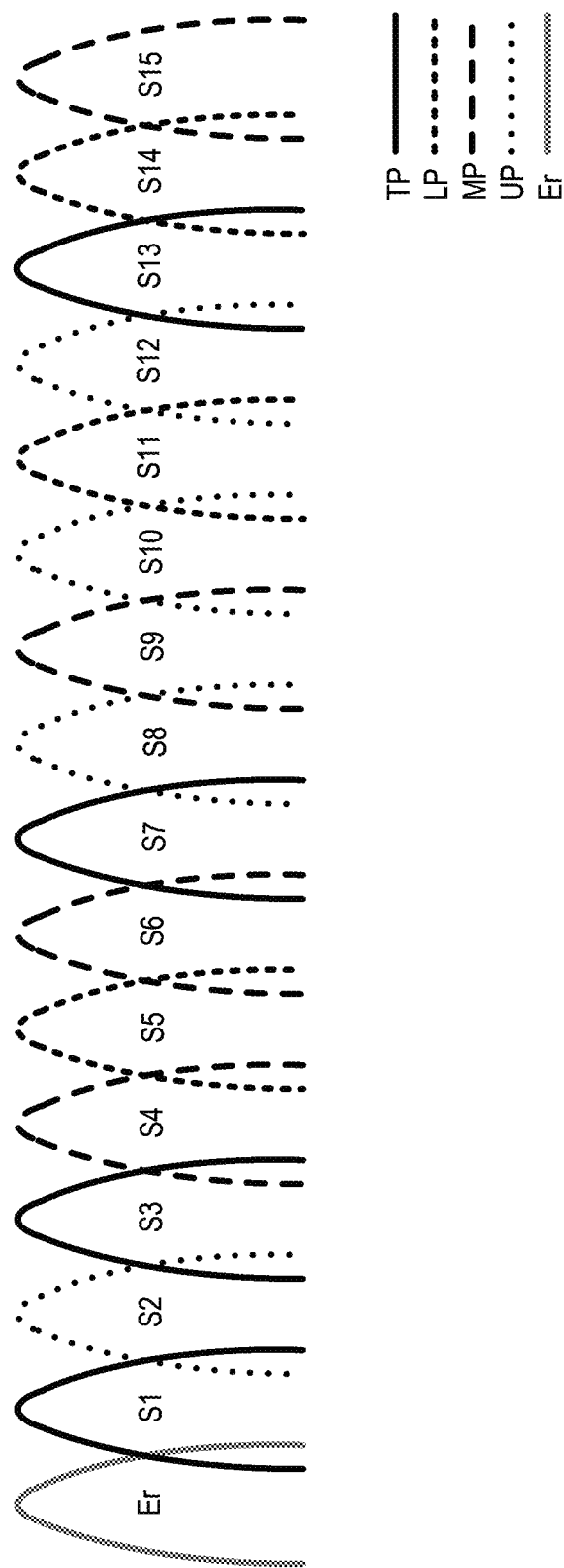
FIG. 5 is a graph of voltage thresholds of an embodiment before data retention and reliability effects.
Figure 6:
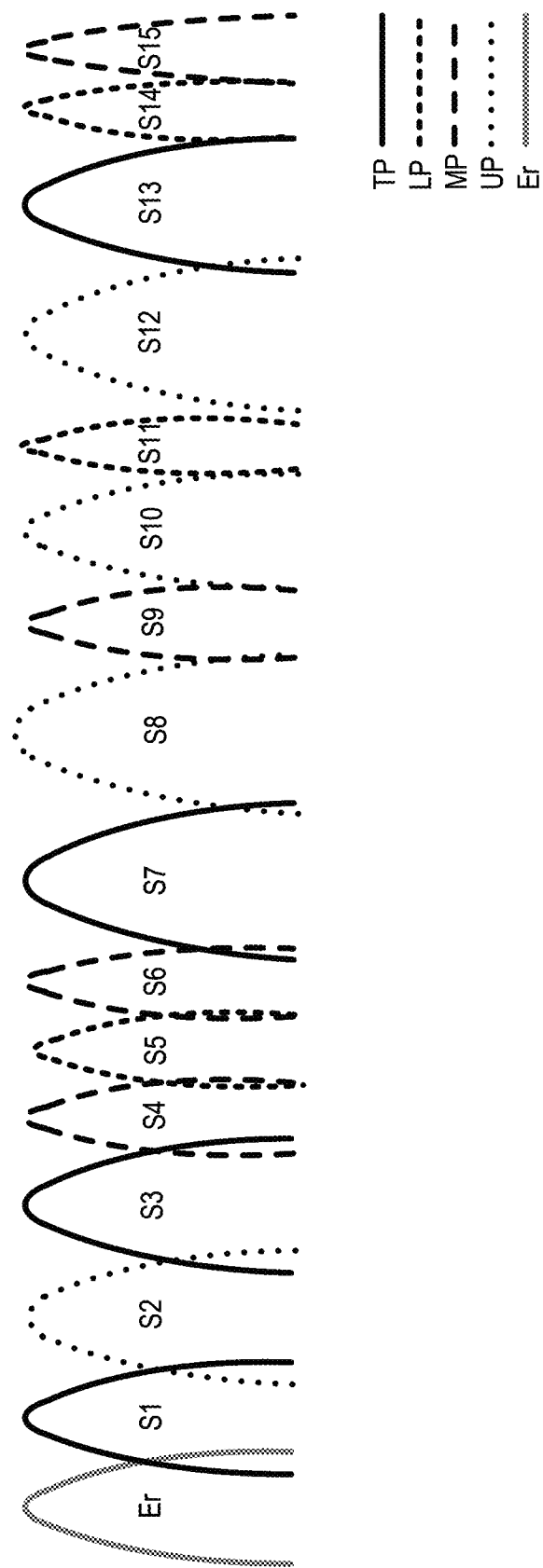
FIG. 6 is a graph of voltage thresholds of an embodiment after data retention and reliability effects.

So, in this example, the controller 102 can use the MP for one year at 30 C and later use the LP for six months more. The QLC block will have valid host data only in its TP and UP. After the short-term duration expires, those MP/LP states can be narrowed down with dummy data, and the TP/UP data, which has host data, can have wider voltage threshold windows. This way, host data can be managed well in a QLC block where the reliability was worse earlier due to having the fewer bad pages in it. This is illustrated in FIGS. 5 and 6. FIG. 5 is a graph of voltage thresholds of an embodiment before data retention and reliability effects until one year at 30 C, and FIG. 6 is a graph of voltage thresholds of an embodiment after data retention and reliability effects after one or one-and-half years at 30 C.

In one embodiment, the controller 102 can use the high data retention QLC pages to copy secondary block data (e.g., firmware control data, a flash translation layer relocation data, SLC folding data, etc.). This may be advantageous in low-grade memories, wherein there is high risk of data loss if such data is only stored as a primary copy without a secondary copy as backup.

These embodiments can also provide a large savings in terms of block budget, as illustrated in the table in FIG. 7. Further, these embodiments do not reduce the overall capacity of the memory 104 but instead reuses pages where the high data retention problem is evident. Such pages can be used as a backup during secondary operations, as noted above. Also, these embodiments do not disturb any ongoing reliability checkpoints but, instead, provide additional protection after an end-of-life reliability warning or during runtime if some unexpected failures are seen.

Also, in conventional memory, pages and blocks with high data retention problems are discarded and marked as a grown bad block (GBB). However, these embodiments recognize that such pages and blocks can be reused to extend the life of the memory 104. For example, in the example memory described above, the life of the memory is committed to one year at a temperature of 30 C. However, with these embodiments, the LP/UP/TP can be used (since the MP is worse in the above example) and still cater to secondary data backup or some internal operations. Whenever there is an actual fail on the primary copies, the controller 102 can rely on the secondary data backup and cater to the host 300 with minimal uncorrectable error correction code (UECC) error or minimal error handling. Also, since only the MP is worse after one year at 30 C, the LP, UP, and TP can still cater to one more year at 30 C. So, the life of the memory 104 or the warranty of data storage device 100 can be increased by one year such cases.

There are several possible system handing use case implementations. For example, with device characterization and inputs from memory health monitoring teams, data can be obtained on the QLC memory-page-wise data retention behavior for each node as well as each trim, which can vary product to product. Post alignment data on wafer/LOT/trim across each QLC die can be used to generate block-wise data stating the health of QLC pages (e.g., best to worst=TP>UP>LP>MP). The workload/use case of the product can be aligned and defined by certain high priority system operations. High-performance products may have memory defects (e.g., short-term data retention) and fail to deliver the best performance throughout the life of the drive and end up compromising high-priority system requests by putting them in a queue or marking more QLC. Hence, a high-priority system request queue can be used.

Figure 8:
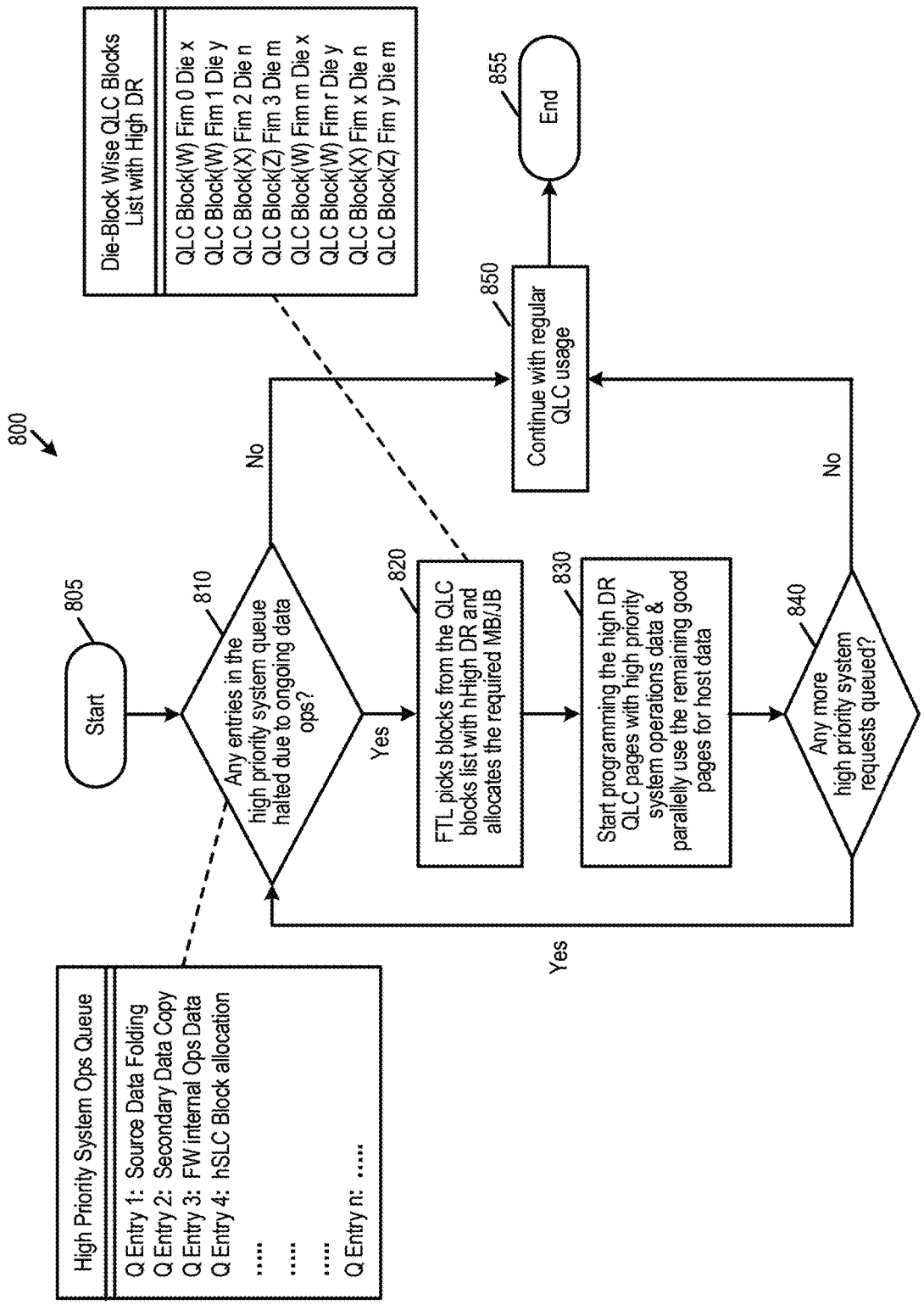
FIG. 8 is a flow chart of a method of an embodiment for storing selected data in relatively-lower data retention pages of a quad-level cell memory.

Once the data set of the QLC short-term high data retention blocks (with their page-wise data) and high-priority system requests queue are aligned for the product, the method shown in the flow chart 800 in FIG. 8 can be used. As shown in FIG. 8, in this method, the controller 102 determines if any entries in the high-priority system queue have been halted due to ongoing data operations (810). If not, the controller 102 continues with regular QLC usage (850), and the method ends (855). Otherwise, the controller 102 (e.g., using its FTL algorithm) picks blocks from the QLC block list with high data retention and allocates the required meta block/jumbo block (820). The controller 102 then starts programming the high data retention QLC pages with high-priority system operations data and, in parallel, uses the remaining good pages for host data (830). Next, the controller 102 determines whether there are any more high-priority systems requests pending (840). If there are, the method loops back to 810; otherwise, the controller 102 continues with regular QLC usage (850), and the method ends (855).

There are several advantages associated with these embodiments. For example, these embodiments can be used to improve a block budget with a margin of ten or more blocks across different capacities. These embodiments can also help in maintaining a consistent performance by serving critical system operations in parallel. Additionally, these embodiments can provide full utilization of the QLC block even if one or two page-types are having data retention problems. In some situations, these embodiments, which be used in both prime and non-prime products, can increase the life of a memory in a non-prime product from six months to one year.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a quad level cell (QLC) memory comprising a lower page (LP), a middle page (MP), an upper page (UP), and a top page (TP); and
   one or more processors, individually or in combination, configured to:
      determine data reliability of each of the pages;
      write data for an internal data storage device operation in a first set of pages whose data retention is below a threshold; and
      write host data in a second set of pages whose data retention is above the threshold.

2. The data storage device of claim 1, wherein the one or more processors, individually or in combination, are further configured to:
   write dummy data in the first set of pages to provide wider voltage threshold windows for the second set of pages.

3. The data storage device of claim 1, wherein the internal data storage device operation comprises a static relocation.

4. The data storage device of claim 1, wherein the internal data storage device operation comprises a folding operation.

5. The data storage device of claim 1, wherein the internal data storage device operation comprises a generating a secondary copy of data.

6. The data storage device of claim 1, wherein the data comprises firmware control data.

7. The data storage device of claim 1, wherein the data comprises flash translation layer relocation data.

8. The data storage device of claim 1, wherein the data comprises single-level cell (SLC) folding data.

9. The data storage device of claim 1, wherein the quad-level cell memory comprises a three-dimensional memory.

10. In a data storage device, a method comprising:
    determining if an entry in a priority queue has been halted due to ongoing data operations, wherein the entry is for a priority internal data storage device operation; and
    in response to determining that the entry has been halted:
       writing data for the priority internal data storage device operation in page(s) of a quad level cell (QLC) memory whose data retention is above a threshold; and
       writing host data in other page(s) of the QLC.

11. The method of claim 10, wherein the data for the priority internal data storage device operation and the host data are written in parallel.

12. The method of claim 10, wherein the priority internal data storage device operation comprises a static relocation.

13. The method of claim 10, wherein the priority internal data storage device operation comprises a folding operation.

14. The method of claim 10, wherein the priority internal data storage device operation comprises generating a secondary copy of data.

15. The method of claim 10, wherein the data comprises firmware control data.

16. The method of claim 10, wherein the data comprises flash translation layer relocation data.

17. The method of claim 10, wherein the data comprises single-level cell (SLC) folding data.

18. The method of claim 10, further comprising selecting a block from a block list and allocating the block to the priority internal data storage device operation.

19. The method of claim 10, wherein the plurality of pages comprises of a lower page (LP), a middle page (MP), an upper page (UP), and a top page (TP).

20. A data storage device comprising:
    a memory comprising a multi-level cell memory comprising a plurality of pages;
    means for determining data reliability of each of the pages;
    means for writing data for an internal data storage device operation in pages whose data retention is below a threshold; and
    means for writing host data in pages whose data retention is above the threshold.

* * * * *